United States Patent
Yu et al.

(10) Patent No.: US 11,403,448 B1
(45) Date of Patent: Aug. 2, 2022

(54) APPARATUS AND METHOD FOR MAPPING FOUNDATIONAL COMPONENTS DURING DESIGN PORTING FROM ONE PROCESS TECHNOLOGY TO ANOTHER PROCESS TECHNOLOGY

(71) Applicant: Taiwan Semiconductor Manufacturing Co., Ltd., Hsinchu (TW)

(72) Inventors: Chih-yuan Stephen Yu, San Jose, CA (US); Boh-Yi Huang, San Jose, CA (US); Chao-Chun Lo, San Jose, CA (US); Xiang Guo, San Jose, CA (US)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 17/239,000

(22) Filed: Apr. 23, 2021

(51) Int. Cl.
| | |
|---|---|
| *G06F 30/30* | (2020.01) |
| *G06F 30/323* | (2020.01) |
| *G06F 30/392* | (2020.01) |
| *G06F 30/327* | (2020.01) |
| *G06F 115/06* | (2020.01) |

(52) U.S. Cl.
CPC .......... *G06F 30/323* (2020.01); *G06F 30/327* (2020.01); *G06F 30/392* (2020.01); *G06F 2115/06* (2020.01)

(58) Field of Classification Search
None
See application file for complete search history.

(56) References Cited

U.S. PATENT DOCUMENTS

| | | | | |
|---|---|---|---|---|
| 5,519,627 A | * | 5/1996 | Mahmood | G06F 30/30 716/103 |
| 5,841,663 A | * | 11/1998 | Sharma | G06F 30/30 716/104 |
| 11,055,455 B1 | * | 7/2021 | Goel | G06F 30/392 |

* cited by examiner

*Primary Examiner* — Leigh M Garbowski
(74) *Attorney, Agent, or Firm* — Duane Morris LLP

(57) ABSTRACT

A method and system for migrating an existing ASIC design from one semiconductor fabrication process to another are disclosed herein. In some embodiments, a method for migrating the existing ASIC design comprises parsing the gate-level netlist one row at a time into one or more standard cells forming the ASIC design, forming a plurality of mapping tables having mapping rules for mapping the parsed one or more standard cells into equivalent target standard cells implemented in the second semiconductor fabrication process, mapping the parsed one or more standard cells into the equivalent target standard cells using the plurality of mapping tables, and generating a target gate-level netlist describing the ASIC design in terms of the equivalent target standard cells.

20 Claims, 6 Drawing Sheets

US 11,403,448 B1

APPARATUS AND METHOD FOR MAPPING FOUNDATIONAL COMPONENTS DURING DESIGN PORTING FROM ONE PROCESS TECHNOLOGY TO ANOTHER PROCESS TECHNOLOGY

BACKGROUND

Application specific integrated circuits (ASICs) are widely used to implement multifunctional electronic circuits for mass production. ASICs may be designed using the full-custom technique or the standard-cell technique. In the full-custom technique, small blocks (or cells) are manually laid out by hand, one rectangle or polygon at a time to build transistors, then logic gates, and then more complex integrated circuits. For complex ASIC chip designs, the layout and assembly processes for the full-custom technique require a large number of highly skilled designers and long development periods.

On the other hand, the standard-cell technique for designing chips is a much simpler process and has gained wide use. The standard-cell is a group of one or more circuit elements such as transistors, capacitors, and other basic circuit elements connected together to perform a simple logic function. Physical layouts and timing behavior models are also created for the standard-cells. A large group of pre-designed standard cells is then assembled into a standard cell library, which is typically provided at a nominal cost by the fabrication vendor who will eventually produce the actual chip. Examples of these standard cell libraries are available from fabrication vendors such as Taiwan Semiconductor Manufacturing Company (TSMC). Moreover, the ASIC fabrication vendors may also provide ASIC design technology libraries that include information about the process technology including line width and spacing for each metal layer, via rules, and electrical information such as the resistance of each layer and the capacitance between layers.

Since semiconductor fabrication technology is moving to sub-10-nm channel widths, which provide improved chip area utilization and reduced power consumption, ASIC designers and electronic companies need to migrate their existing designs to the latest technology as quickly and efficiently as possible to avoid losing any opportunity to market their products and designs. Generally, transferring an old design to a new technology requires engineers to go through a long and tedious design process of starting over with the RTL description of the design. A company that has several design teams participating at multiple stages of the design process will therefore have to expend a large amount of time and cost for their teams to migrate the existing designs to the latest technology.

The migration process of an existing ASIC design from one technology to another typically involves automated synthesis software tools that can take a netlist description of the integrated circuit and map it into an equivalent netlist comprising standard cells of the latest target technology. However, this process is time consuming and requires expensive automated software tools as well as access to fabrication vendors' standard cell libraries.

Thus, it is desirable to overcome the foregoing deficiencies of prior netlist migration methods and provide fast turnaround times for the existing ASIC design migration with minimal effort on the part of the design engineers.

The information disclosed in this Background section is intended only to provide context for various embodiments of the invention described below and, therefore, this Background section may include information that is not necessarily prior art information (i.e., information that is already known to a person of ordinary skill in the art). Thus, work of the presently named inventors, to the extent the work is described in this background section, as well as aspects of the description that may not otherwise qualify as prior art at the time of filing, are neither expressly nor impliedly admitted as prior art against the present disclosure.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

Figure 1:
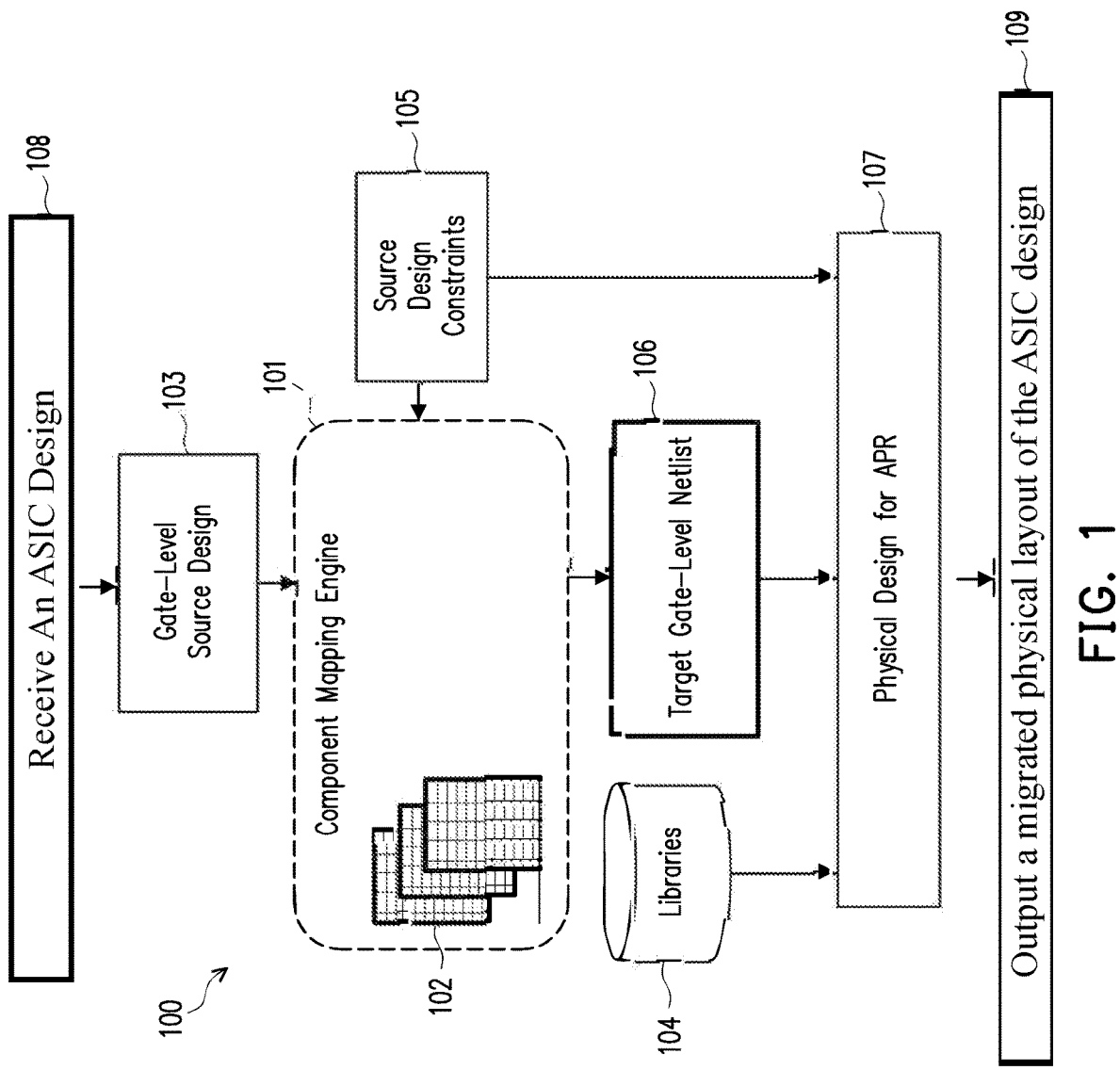
FIG. 1 illustrates a flowchart describing a gate-netlist migration process using a component mapping technique that does not involve automatic ASIC synthesis tool(s), in accordance with some embodiments.

As illustrated in FIG. 1, an automatic ASIC synthesis tool(s) 100 accepts inputs such as the gate-level source design 103, a source design constraints 105 that are associated with the gate-level source design 103, a source set of technology libraries, and a target set of technology libraries 104. In some embodiments, the source design constraints 105 may be any set of rules, barriers, or restrictions that limits the variability of an integrated circuit design. The source design constraints 105 may also include timing constraints that specify the external timing behavior of the integrated circuit. The source and target sets of technology libraries comprise logical and physical descriptions of the standard-cells and perhaps custom logic cells, functional blocks, and macro cells that are available for instantiation in an integrated circuit design for a particular semiconductor manufacturing process.

FIG. 1 illustrates a flowchart describing a gate-netlist migration process 100 using a component mapping technique that does not involve the automatic ASIC synthesis tool(s), in accordance with some embodiments. In some embodiments, the gate-netlist migration process 100 receives an ASIC design 108 often specified using hardware description language (HDL) such as Verilog HDL. Moreover, the gate-netlist migrate process 100 includes a component mapping engine 101 that accepts inputs such as a gate-level source design 103 of the ASIC design 108 (e.g., "Golden Source Functional Gate Netlists") and source design constraints 105 that are associated with the gate-level source design 103. In some embodiments, the gate-level source design 103 may be synthesized from Register Transfer Level (RTL) source code by an RTL Compiler synthesis tool. In further embodiments, the gate-level source design 103 comprises a hierarchical or flattened gate level netlist representing the circuit to be migrated. The various signals in a design are referred to as nets. A hierarchical netlist is made of a list of blocks, whereas a flattened netlist comprises only one block. A netlist block may include component(s) and a description of their interconnection using nets. Components can be reduced to combinatorial or sequential logic gates, or they may be lower level hierarchical blocks. For example, a component may be a standard cell denoting a single combinatorial logic function (e.g., AND, NAND, NOR, OR, XOR, NXOR, etc.) or a single storage element such as a flip-flop or latch for sequential logic. Alternatively, the components may be library cells which can be represented by a set of standard cells. In yet another example, a component may also be a programmable primitive that represents a set of logic functions and storage. In alternative embodiments, a component may be a macro block denoting a complex logic function such as memories, counters, shifters, adders, multipliers, etc. Each of these can be further reduced to standard cells forming combinatorial or sequential logic.

In some embodiments, the component mapping engine 101 may include a plurality of mapping tables 102 organized in a database. Moreover, each row of the plurality of mapping tables 102 may map a standard cell from one semiconductor fabrication technology to another. For example, a row in one of the plurality of mapping tables 102 may map a standard component (e.g., AND, NAND, NOR, OR, XOR, NXOR, etc.) described in the 28 nm fabrication process to an equivalent component in the 10 nm fabrication process. An exemplary mapping table implemented in the component mapping engine 101 is shown in Table 1 below. In the exemplary mapping Table 1, the first column lists the standard components from a source technology library. The source technology library may include a plurality of standard cells implemented in a dated semiconductor fabrication process (e.g., 65 nm). In some embodiments, a database of the plurality of mapping tables may be generated. In one exemplary embodiment, each of the plurality of mapping tables in the database may be identified or indexed based on source and target technology libraries. In some embodiments, the source technology library may also include layout, schematic, and simulations views used by automated place and route tools. The second column of Table 1 defines the inputs and outputs for the standard cells listed in the first column. For example, Table 1 lists a two-input "NAND2" standard cell having input terminals "A" and "B" and an output terminal "Z". Moreover, the third column lists the standard cells from a target technology library. The target technology library may include a plurality of standard cells implemented in a new semiconductor fabrication process (e.g., 10 nm). In some embodiments, the target technology library may also include layout, schematic, and simulations views used by automated place and route tools that generate circuit layout for fabrication using the target semiconductor manufacturing technology. The fourth column of Table 1 defines the inputs and outputs for the standard cells listed in the third column. For example, Table 1 lists a two-input "ND2" standard cell having input terminals "In1" and "In2" and an output terminal "Out". As such, the first and third columns of Table 1 provide one-to-one mapping of the standard cells defined in the source technology library to the standard cells defined in the target technology library. Furthermore, the second and fourth columns of Table 1 provide one-to-one mapping of the input and output terminals the standard cells defined in the source technology library to the input and output terminals of the standard cells defined in the target technology library. For example, in accordance with mapping rule specified in Table 1, the two-input "NAND2" standard cell of the source technology library is mapped to the two-input "ND2" standard cell of the target technology library, the inputs terminals "A" and "B" of the "NAND2" standard cell are mapped to the inputs terminals "In1" and "In2" of the ND2 standard cell and the output terminal "Z" of the "NAND2" standard cell is mapped to the output terminal "Out" of the ND2" standard cell.

TABLE 1

| Source Technology Library Cell | Source Library Cell Interfaces | Target Technology Library Cell | Target Library Cell Interfaces |
| --- | --- | --- | --- |
| INV | A, Z | INV | In, Out |
| BUF | A, Z | BUF | In, Out |
| NAND2 | A, B, Z | ND2 | In1, In2, Out |
| NAND3 | A, B, C, Z | ND3 | In1, In2, In3, Out |
| NOR2 | A, B, Z | NR2 | In1, In2, In3, Out |
| NOR3 | A, B, C, Z | NR3 | In1, In2, In3, Out |
| FF | D, Q, CLK, SI, SE | FF1B | d, q, ck, se, se |
| ... | ... | ... | ... |

In some embodiments, the component mapping engine 101 may include a netlist parser that is configured to perform line based parsing of the gate-level source design 103 and a target netlist writer configured to generate the target gate-level netlist 106 using the plurality of mapping tables 102. The netlist parser and the target netlist writer are described in more detail below.

As shown in FIG. 1, a target gate-level netlist 106 provided by the component mapping engine 101 may be used by an automatic place and route tools to generate a physical layout 107 which then can be used to complete and manufacture the ASIC described in the gate-level source design 103 using a new semiconductor manufacturing process specified in the target set of technology libraries 104. In some exemplary embodiments, the gate-netlist migration process 100 may output a migrated physical layout 109 of the ASIC design for manufacturing under the target fabrication process.

One exemplary advantage of the gate-netlist migration process 100 having the component mapping engine 101 is a decrease in a run-time needed to migrate a design from one technology process to another. This is due to the component mapping engine 101 performing standard cell mapping from one semiconductor fabrication technology to another using the plurality of mapping tables 102. Another exemplary advantage of the gate-level netlist migration process 100 is that it provides an improved capability for migrating a design from one semiconductor technology process to another without using a $3^{rd}$ party automatic ASIC synthesis tool(s), which also enables for implementing fast Design Technology Co-Optimization (DTCO) solutions that optimize the power, performance and area (PPA) design metrics.

Figure 2:
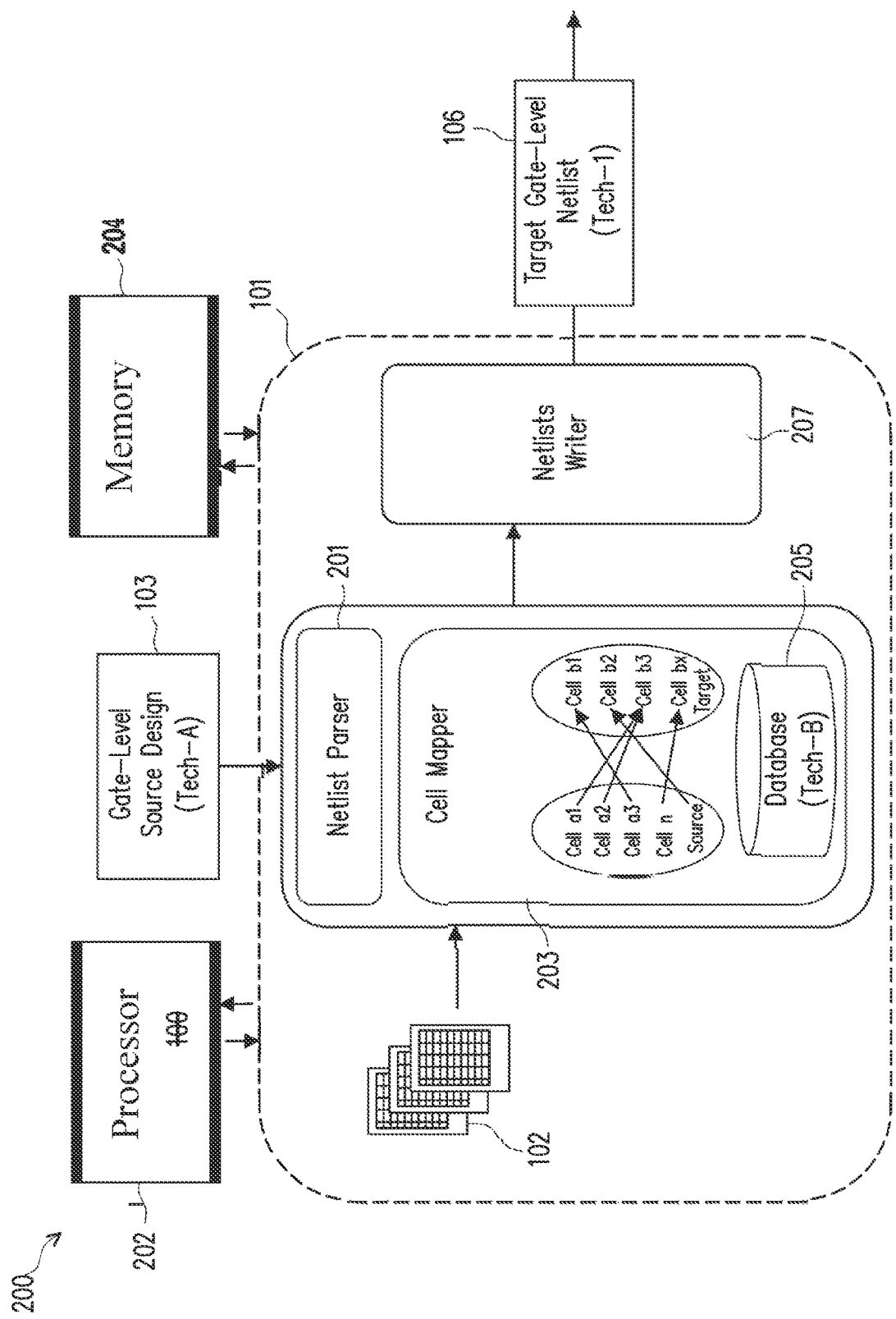
FIG. 2 illustrates a block diagram of an integrated circuit design system 200, in accordance with some embodiments.

FIG. 2 illustrates a block diagram of an integrated circuit design system 200 that includes the component mapping engine 101 accepting the gate-level source design 103 as input and generating the target gate-level netlist 106, a processor 202, and a memory 204 in accordance with some embodiments.

In one embodiment, the processor 202 executes instructions residing on a machine-readable medium, such as the memory 204. In some embodiments, the instructions may be loaded from the machine-readable medium such as an optical medium (compact disk (CD), digital video disk (DVD), etc.), a magnetic medium (magnetic disk, a magnetic tape, etc.), or a combination of both into the memory 204, which may include Random Access Memory (RAM), dynamic RAM (DRAM), etc. The processor 202 may retrieve the instructions from the memory 204 and execute the instructions to perform the operations of the component mapping engine 101 described below.

Note that any or all of the components and the associated hardware illustrated in FIG. 2 may be used in various embodiments of the system 200. However, it should be appreciated that other configurations of the system 200 may include more or less devices than those shown in FIG. 2.

The system 200 typically includes at least one processor 202 which communicates with a number of peripheral devices via bus subsystem. These peripheral devices may include a memory storage subsystem 204, comprising a memory subsystem and a file storage subsystem, user interface input devices, user interface output devices, and a network interface subsystem. The input and output devices allow user interaction with the system 200.

As shown in FIG. 2, the component mapping engine 101 includes the plurality of mapping tables 102 that provide mapping rules for mapping a standard cell from one semiconductor fabrication technology to another.

In some embodiments, the component mapping engine 101 may further comprise a netlist parser 201 that is configured to parse the received gate-level source design 103 one row at a time. In further embodiments, the gate-level source design 103 may be a text file containing a netlist description of the ASIC circuit and the netlist parser 201 may be a configured to parse the text file representing the ASIC circuit. Moreover, the netlist parser 201 may include a parsing algorithm that parses the netlist text file to obtain parsed netlist data, the parsed netlist data being representative of device data, device attribute data, macro data, macro attribute data, connection data, and connection attribute data of the ASIC circuit.

In further embodiments, the netlist parser 201 may send the parsed source netlist data extracted from the gate-level source design 103 to a cell mapper 203. In some embodiments, the cell mapper 203 may be configured to map the parsed netlist data extracted from the gate-level source design 103 to a target netlist data using the plurality of mapping tables 102. In some embodiments, the source netlist data and the target netlist data may be include names of standard cells, their connection attributes, macros, or macro attributes.

In one exemplary embodiment, the cell mapper 203 may also be configured to provide a direct one-to-one mapping for combinational as well as sequential logic elements. In some embodiments, the cell mapper 203 may also be able to perform one to many mapping when a combinational or sequential logic element of the parsed source netlist data corresponds, based on the plurality of mapping tables 102, to one or more combinational or sequential logic elements in the target fabrication technology.

In some embodiments, the cell mapper 203 may also include a library or database of "wrapper cells" 205, which are provided to the component mapping engine 101 for migrating large cells, such as microprocessors and microcontrollers, or groups of cells from gate-level source design 103 to the target gate-level netlist 106 (FIG. 1). In some embodiments, each wrapper cell has a footprint that matches the footprint of a corresponding group of one or more of the standard cells. In some embodiments, the library or database 205 may include custom logic cells, functional blocks, and macro cells that are used for migrating the custom logic cells, functional blocks, or macro cells found in the gate-level source design 103 to the target gate-level netlist 106.

In some embodiments, the component mapping engine 101 may further include the target netlist writer 207 coupled to the mapper 203 and configured to generate the target gate-level netlist 106. In further embodiments, the target netlist writer 207 may be configured to generate a text file containing a gate-level netlist description of the migrated ASIC circuit. As such, the gate-level netlist description of the migrated ASIC circuit may include device data, device attribute data, macro data, macro attribute data, connection data, and connection attribute data of the migrated ASIC circuit.

Figure 3:
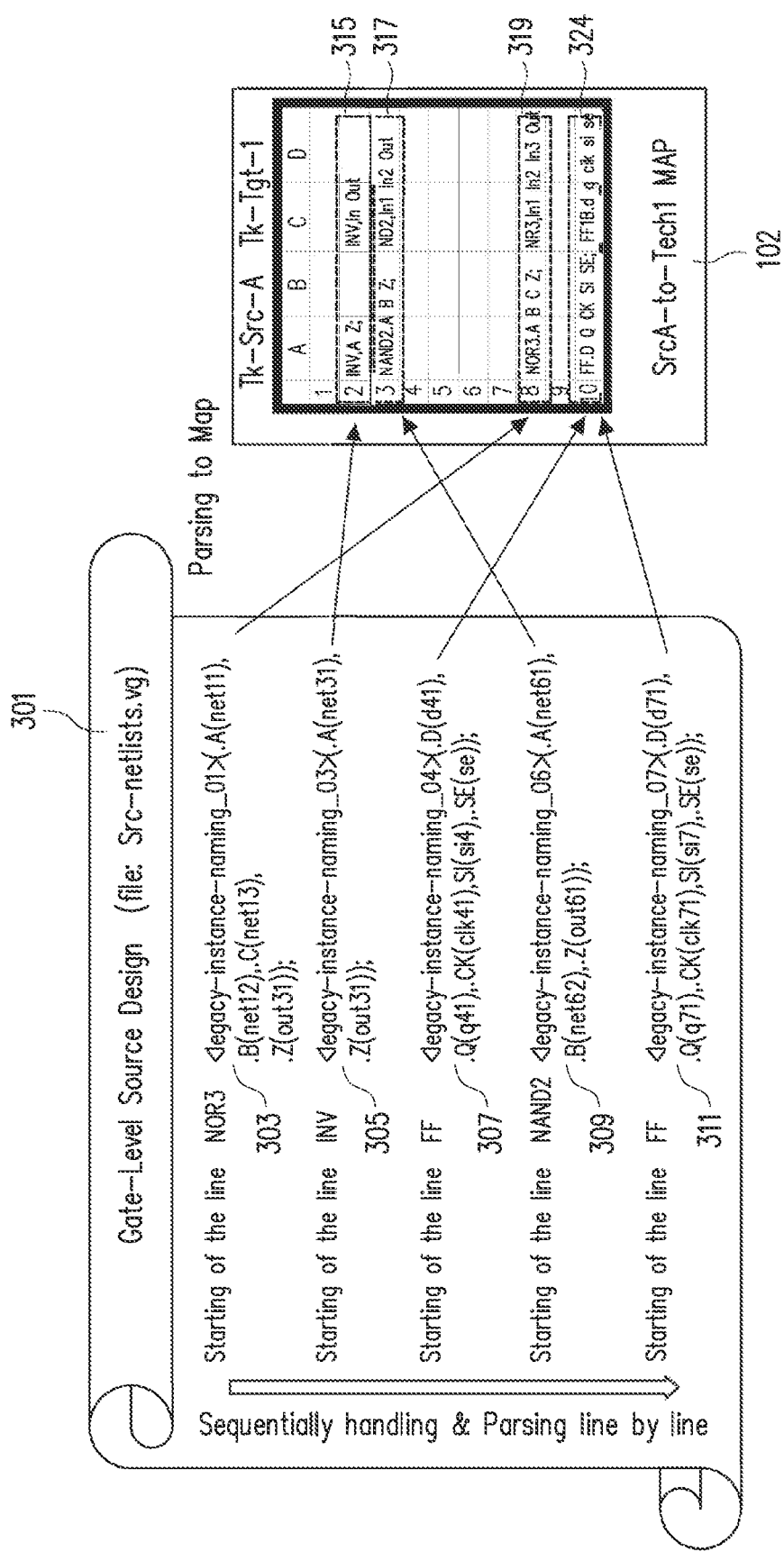
FIGS. 3 and 4 are block diagrams of netlist parsing, mapping, and generation processes performed by the component mapping engine 101 (see FIG. 1), in accordance with some embodiments.
Figure 4:
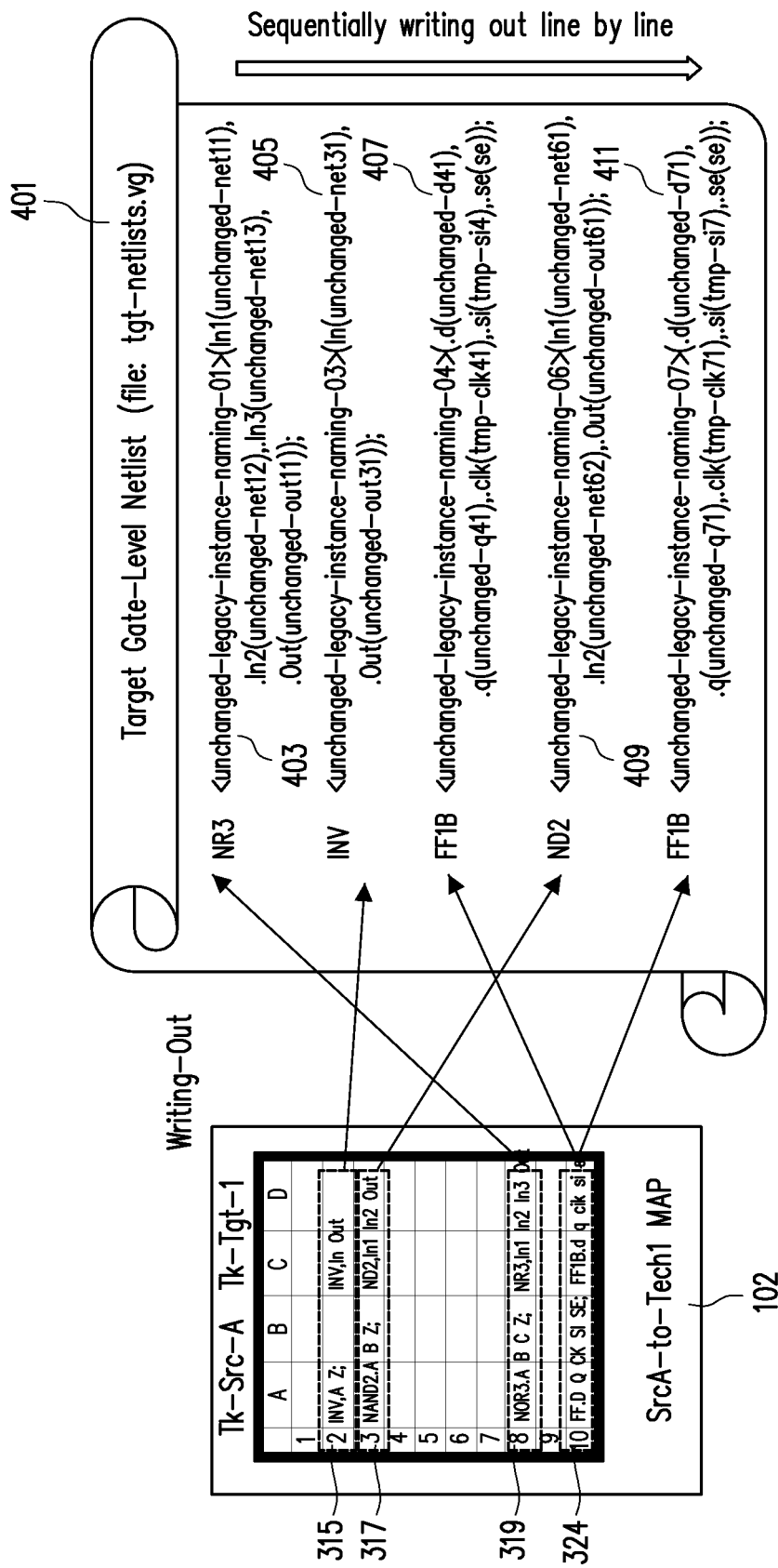

FIGS. 3 and 4 are block diagrams of the source gate-level netlist parsing, mapping, and target gate-level netlist generation processes performed by the component mapping engine 101, respectively, in accordance with some embodiments.

Referring now to FIG. 3, the netlist parser 201 (FIG. 2) may be configured to receive a text file 301 comprising a gate-level netlist of an ASIC chip design that needs to be migrated. In some embodiments, the text file having the gate-level netlist may be synthesized from a Verilog or VHDL format.

In further embodiments, the netlist parser 201 starts parsing the text file 301 one line at a time until it reaches the last line or the End of File (EoF) character. As shown in FIG. 3, the netlist parser 201 may parses the first line of the text file 301 into a three input NOR gate 303 having the node "net11" connected to its "A" input terminal, the node "net12" connected to its "B" input terminal, and the node "net13" connected to its "C" input terminal, while the node "out11" is connected to NOR gate's output terminal. The netlist parser 201 subsequently parses the remaining lines of the text file 301 into an inverter 305, a first flip-flop 307, a two input NAND gate, and a second flip-flop 311, in accordance with further embodiments. In some embodiments, the netlist parser 201 may parse the gate-level netlist in the text file 301 into a data structure such as a directed graph with graph's vertices serving as parsed standard cells (e.g., three input NOR gate 303, inverter 305, first flip-flop 307, or two input NAND gate 309) and directed edges as inputs and outputs of the parsed standard cells. In other embodiments, the netlist parser 201 may utilize a directed acyclic graph to represent standard cells parsed from the text file 301.

In further embodiments, the mapper 203 (FIG. 2) may look up each parsed standard cell in the first column of the plurality of mapping tables 102 for a matching entry. The mapper may subsequently map each parsed standard cell to an equivalent standard cell implemented in a target semiconductor fabrication technology based on the mapping rules defined in the plurality of mapping tables 102. For example, the mapper 203 may map the inverter 305 into an inverter implemented in a target semiconductor fabrication technology using a first mapping rule 315. As such, the two input NAND gate 309 may be mapped into a two input ND2 gate implemented in a target semiconductor fabrication technology using a second mapping rule 317. Moreover, the three input NOR gate 303 may be mapped into a three input NR3 gate implemented in a target semiconductor fabrication technology using a third mapping rule 319. And finally, the first and second flip-flops 307 and 311 may each be mapped into a flip-flop implemented in a target semiconductor fabrication technology using a fourth mapping rule 324.

Referring now to FIG. 4, a target netlist text file 401 may be generated by the target netlist writer 207 (FIG. 2) based on mapping rules defined in the plurality of mapping tables 102. More specifically, the target netlist text file 401 may be generated by the target netlist writer 207 (FIG. 2) based on the first 315, second 317, third 319, and fourth 324 mapping rules, in accordance with some embodiments. In further embodiments, the target netlist may be encoded as ASCII or Unicode text.

In further embodiments, the target netlist writer 207 may generate a three input NR3 gate 403 in the target netlist text file 401 that corresponds to the three input NOR gate 303 in the received text file 301. Likewise, the target netlist writer 207 may further generate an inverter 405, a first flip-flop 407, a two input ND2 gate 409 and a second flip flop 411 in the target netlist text file 401 that correspond to the inverter 305, the first flip-flop 307, the two input NAND2 gate 309 and the second flip-flop 311 defined in the received text file 301, respectively.

Figure 5:
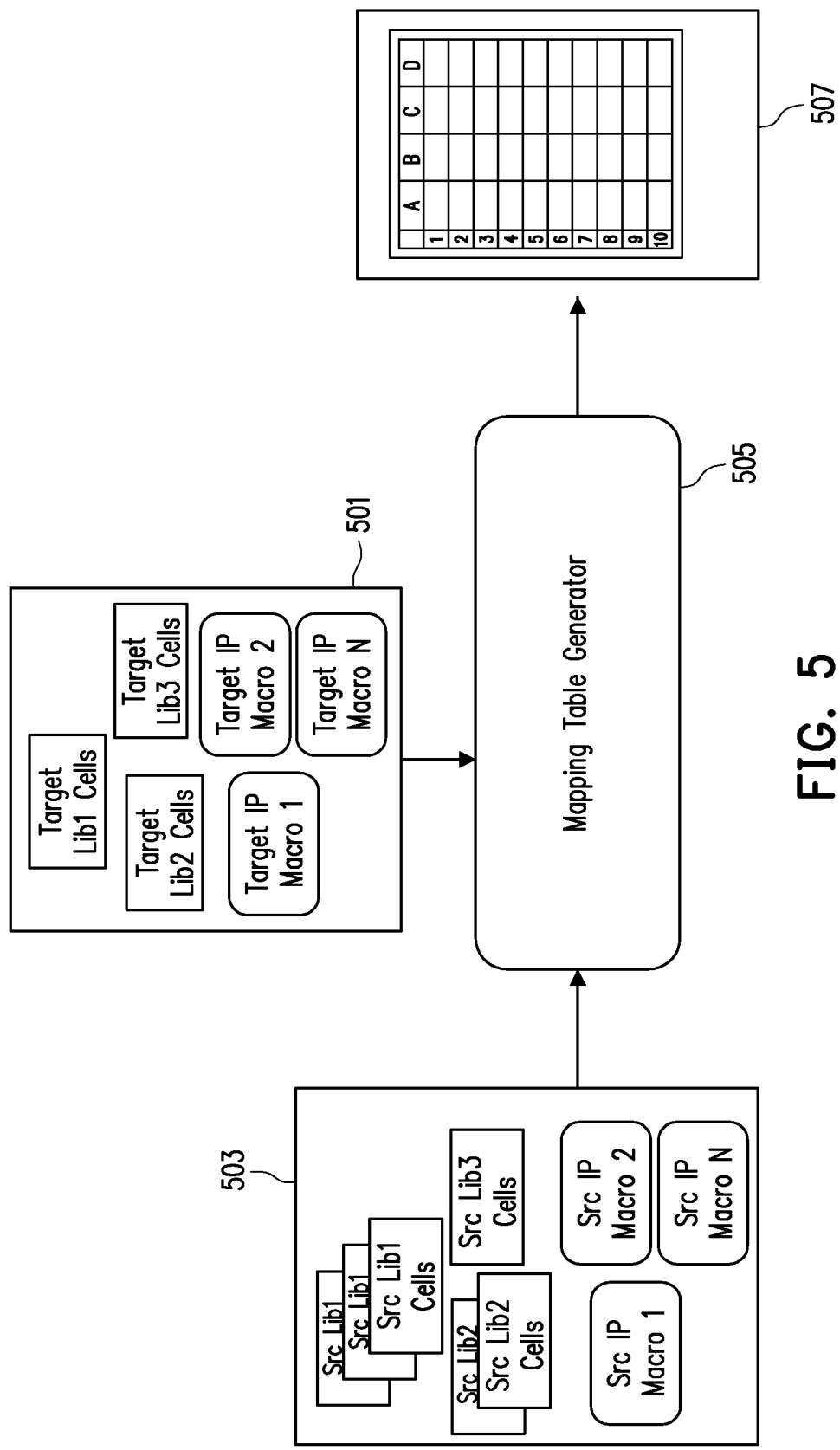
FIG. 5 illustrates a flowchart for generating a database of mapping tables that specify mapping rules for migrating standard cells defined in a plurality of source component libraries to equivalent components defined in a plurality of target component libraries, in accordance with some embodiments.

FIG. 5 illustrates a flowchart diagram for generating a database 507 of mapping tables that specify mapping rules for migrating standard cells defined in a plurality of source component libraries 503 to equivalent components defined in a plurality of target component libraries 501, in accordance with some embodiments. In some embodiments, the plurality of source component libraries 503 may include one or more standard and macro cell libraries. Moreover, the plurality of source component libraries 503 define standard and macro cells in a source fabrication technology that may not be current. On the other hand, the plurality of target component libraries 501 define equivalent standard and macro cells in a target or desired fabrication technology that is most up to date. For example, the plurality of source component libraries 503 may specify standard and macro cells in 65 nm fabrication technology, whereas the plurality of target component libraries 501 may specify equivalent standard and macro cells in 10 nm fabrication technology.

In some embodiments, the database 507 of mapping tables may be generated by a mapping table generator 505 that is configured to accept the source component libraries 503 and the target component libraries 501 as inputs. In further embodiments, the mapping table generator 505 may select equivalent standard and macro cells from the plurality of target component libraries 501 based on design factors, such as footprint and complexity of the candidate cells. As used herein, footprint of a standard cell means planner dimensions of its layout. Moreover, complexity of a standard cell is determined by the number of logic gated used to implement the standard cell's functionality. For example, while implementing the same functionality, a standard cell with fewer logic gates is less complex than a standard cell with a large number of logic gates.

Figure 6:
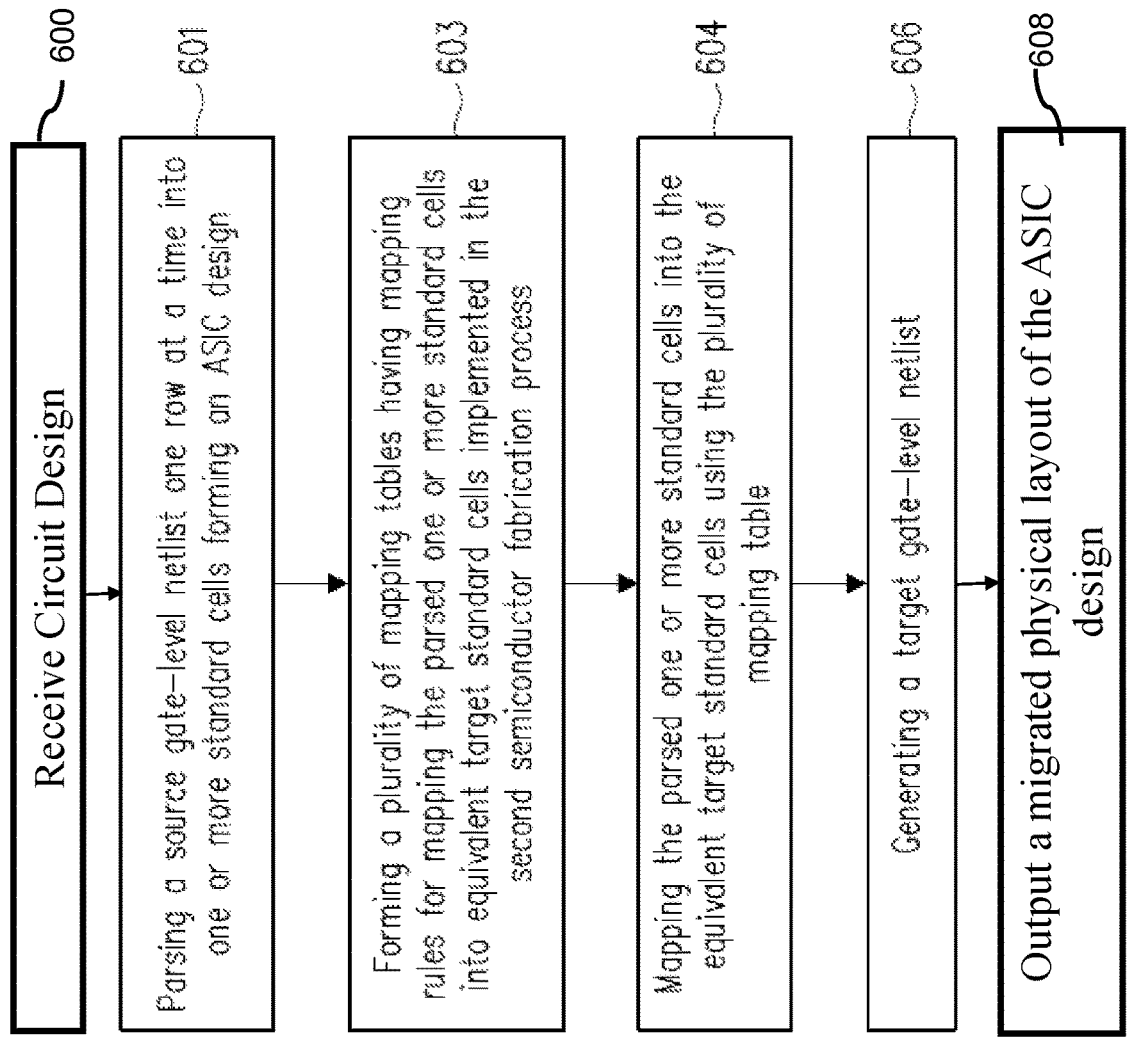
FIG. 6 illustrates a flow diagram of a method for migrating existing ASIC designs to a latest technology, in accordance with some embodiments.

FIG. 6 illustrates a flow diagram of a method for migrating an existing ASIC design to a latest fabrication technology, in accordance with some embodiments. At operation 600, an ASIC circuit design is received. In some embodiments, the ASIC circuit design may be specified using hardware description language (HDL) such as Verilog HDL.

At operation 601, a source gate-level netlist describing the existing ASIC design may be parsed one row at a time and one or more standard cells forming the existing ASIC design may be extracted. In some embodiments, the gate-level netlist may be a text file synthesized from a Register Transfer Level (RTL) source code by an RTL Compiler synthesis tool. In further embodiments, the source gate-level netlist may comprise a hierarchical or flattened gate level netlist representing the existing ASIC circuit to be migrated. Moreover, the source gate-level netlist may include component(s) and a description of their interconnections using nets. Furthermore, the components source gate-level netlist can be reduced to combinatorial or sequential logic gates, or they may be hierarchical blocks of lower level. In some embodiments, the source gate-level netlist may be parsed into a data structure such as a directed graph with graph's vertices serving as parsed standard cells and directed edges as inputs and outputs of the parsed standard cells.

At operation 603, a plurality of mapping tables comprising mapping rules for mapping the parsed one or more standard cells implemented in a first semiconductor fabrication process into equivalent target standard cells implemented in a second semiconductor fabrication process may be formed. In some embodiments, the plurality of mapping tables may be formed based on the plurality of source component libraries 503 and the plurality of target component libraries 501. In some embodiments, each row of the plurality of mapping tables may map a standard cell or macro from one semiconductor fabrication technology to another. In further embodiments, if there are two or more equivalent candidate standard or macro cells in the plurality of target component libraries 501, the mapping table generator 505 may generate the plurality of mapping tables of the candidate standard or macro cells based on footprint, composition, and complexity of the candidate cells.

At operation 604, the standard or macro cells may be mapped into the equivalent target standard cells using the plurality of mapping tables. In one exemplary embodiment, the mapping may be one-to-on, where a standard or macro cell is mapped to one equivalent candidate standard or macro cell. In another embodiment, the mapping may also be one to many when a standard macro cell of the parsed source gate-level netlist corresponds to one or more equivalent candidate standard or macro cells in the target fabrication process.

At operation 606, a target gate-level netlist may be generated. In some embodiments, the target netlist writer 207 (FIG. 2) may be configured to generate the target gate-level netlist. In further embodiments, the generated target gate-level netlist may be a text file containing a gate-level netlist description of the migrated ASIC circuit. Subsequently, the target gate-level netlist may be used by an automatic place and route tools to generate a physical layout of the migrated ASIC circuit which then can be used to complete and manufacture the migrated ASIC using a target semiconductor fabrication process.

At operation 608, a migrated physical layout of the ASIC design for manufacturing under the target fabrication process may be outputted. The migrate physical layout, often referred to as "geometry," may be used to generate the integrated circuit tooling, which is a series of masks, each representing a layer for the ASIC circuit. The tooling is then used by manufacturers to fabricate an integrated circuit.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations are used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, signal, etc. that is physically constructed, programmed, arranged and/or formatted to perform the specified operation or function.

Furthermore, a person of ordinary skill in the art would understand that various illustrative logical blocks, modules, devices, components and circuits described herein can be implemented within or performed by an integrated circuit (IC) that can include a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A processor programmed to perform the functions herein will become a specially programmed, or special-purpose processor, and can be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the broadest scope consistent with the novel features and principles disclosed herein.

What is claimed is:

1. A method for migrating a gate-level netlist having an application-specific integrated circuit (ASIC) design from a first semiconductor fabrication process to a second semiconductor fabrication process comprising:

receiving the ASIC design specified in a hardware description language (HDL);
parsing the gate-level netlist one row at a time into one or more standard cells forming the ASIC design;
forming a plurality of mapping tables having mapping rules for mapping the parsed one or more standard cells to equivalent target standard cells implemented in the second semiconductor fabrication process;
mapping the parsed one or more standard cells to the equivalent target standard cells using the plurality of mapping tables;
generating a target gate-level netlist describing the ASIC design in terms of the equivalent target standard cells; and
outputting migrated physical layout of the ASIC design for manufacturing under the second semiconductor fabrication process.

2. The method of claim 1, wherein the parsing further comprises:
extracting connection attributes of one or more parsed standard cells.

3. The method of claim 2, wherein the mapping rules are defined in each row of
the
plurality of mapping tables.

4. The method of claim 3, wherein the target gate-level netlist is a text file comprising connection attributes of the equivalent target standard cells.

5. The method of claim 1, wherein the forming of the plurality of mapping tables further comprises:
receiving a plurality of source component libraries specifying the one or more standard cells forming the ASIC design in the first semiconductor fabrication process and a plurality of target component libraries specifying the target standard cells in the second semiconductor fabrication process; and
generating the plurality of mapping tables based on the received source and target component libraries.

6. A non-transitory machine-readable medium storing instructions that when executed by a processor performs a method for migrating a netlist of an integrated circuit from a first technology library to a second technology library, the method comprising:
receiving an application-specific integrated circuit (ASIC) design specified in a hardware description language (HDL);
receiving an original netlist;
parsing the original netlist one row at a time to define one or more standard cells;
generating a plurality of mapping tables containing mapping rules that map the one or more standard cells to equivalent target standard cells implemented in the second technology library;
mapping the one or more standard cells to the respective one or more equivalent target standard cells using the plurality of mapping tables;
generating a target netlist describing the integrated circuit in terms of the equivalent target standard cells associated with the second technology library; and
outputting migrated physical layout of the ASIC design for manufacturing under the second semiconductor fabrication process.

7. The non-transitory machine-readable medium of claim 6, wherein the method further comprises extracting connection attributes of one or more standard cells.

8. The non-transitory machine-readable medium of claim 6, wherein the target netlist is encoded in ASCII format and comprises connection attributes of the equivalent target standard cells.

9. The non-transitory machine-readable medium of claim 6, wherein the method further comprises generating mapping rules for mapping the parsed one or more standard cells to the respective one or more equivalent target standard cells implemented using the second technology library, wherein the mapping rules are defined in each row of the plurality of mapping tables.

10. The non-transitory machine-readable medium of claim 9, wherein the method further comprising generating a database from the plurality of mapping tables, wherein each one of the plurality of mapping tables is identified based on the first and second technology libraries.

11. The non-transitory machine-readable medium of claim 6, wherein the method
further
comprises:
parsing the original into one or more macro cells; and
mapping the parsed one or more macro cells into the equivalent target macro cells using a database of wrapper cells.

12. The non-transitory machine-readable medium of claim 6, wherein the method further comprises parsing the original netlist into a directed graph with each vertices of the directed graph assigned to each one of the one or more standard cells.

13. The non-transitory machine-readable medium of claim 12, wherein the method
further
comprises generating a physical layout of the integrated circuit from the target netlist, wherein the physical layout is used to fabricated the integrated circuit in a semiconductor manufacturing process specified by the second technology library.

14. An integrated circuit design system comprising:
a computer having a processor and memory;
a software application, run by the computer processor, and residing in the computer memory;
the software application comprising a plurality of software function modules comprising:
a parser configured to receive a gate-level netlist describing an existing application-specific integrated circuit (ASIC) and parse the gate-level netlist into one or more standard cells;
a cell mapper coupled to the parser and configured to map the parsed one or more standard cells described in an original set of technology libraries to equivalent target standard cells described in a new set of technology libraries using a plurality of mapping tables,
wherein the plurality of mapping tables provide mapping rules for mapping the parsed one or more standard cells to the equivalent target standard cells and wherein the mapping rules are based on the original and the new sets of technology libraries; and
a target netlist writer coupled to the cell mapper and configured to generate a target gate-level netlist describing the ASIC in terms of the equivalent target standard cells.

15. The integrated circuit design system of claim 14, wherein the parser is further configured to extract connection attributes of one or more parsed standard cells.

16. The integrated circuit design system of claim 14, wherein the mapping rules are defined in each row of the plurality of mapping tables.

17. The integrated circuit design system of claim 14, wherein the the plurality of mapping tables are formed based on a plurality of source component libraries specifying the one or more standard cells forming the ASIC design in the first semiconductor fabrication process and a plurality of target component libraries specifying the target standard cells in the second semiconductor fabrication process.

18. The integrated circuit design system of claim 14, wherein the target gate-level netlist is a text file comprising connection attributes of the equivalent target standard cells.

19. The integrated circuit design system of claim 14, wherein the parser is further configured to parse the gate-level netlist into a directed graph with vertices of the directed graph assigned to the one or more standard cells.

20. The integrated circuit design system of claim 14, wherein parser is further configured to parse the gate-level netlist into one or more macro cells, wherein at least one of the one or more macro cells is a microprocessor.

\* \* \* \* \*